US012802998B2

(12) United States Patent
Oh

(10) Patent No.: US 12,802,998 B2
(45) Date of Patent: Nov. 17, 2026

(54) DRY CATHODE FOR ALL-SOLID-STATE BATTERY WITH HIGH ENERGY DENSITY AND METHOD OF MANUFACTURING SAME

(71) Applicants: Hyundai Motor Company, Seoul (KR); Kia Corporation, Seoul (KR)

(72) Inventor: Dae Yang Oh, Hwaseong (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 663 days.

(21) Appl. No.: 18/373,037

(22) Filed: Sep. 26, 2023

(65) Prior Publication Data

US 2024/0339619 A1 Oct. 10, 2024

(30) Foreign Application Priority Data

Apr. 6, 2023 (KR) ........................ 10-2023-0045491

(51) Int. Cl.
*H01M 4/62* (2006.01)
*H01M 4/02* (2006.01)
*H01M 4/04* (2006.01)

(52) U.S. Cl.
CPC ......... *H01M 4/623* (2013.01); *H01M 4/0435* (2013.01); *H01M 2004/021* (2013.01); *H01M 2004/028* (2013.01); *H01M 2220/20* (2013.01)

(58) Field of Classification Search
CPC ............... H01M 4/623; H01M 4/0435; H01M 2004/021; H01M 2004/028; H01M 2220/20; H01M 4/621; H01M 4/625; H01M 10/0562; H01M 2300/0068; H01M 4/131; H01M 4/0402; H01M 4/1391; H01M 4/624; H01M 10/052; H01M 4/62; Y02E 60/10
See application file for complete search history.

(56) References Cited

U.S. PATENT DOCUMENTS

2007/0141440 A1 6/2007 Yang et al.

FOREIGN PATENT DOCUMENTS

| | | | |
|---|---|---|---|
| CN | 105336971 | B | 8/2018 |
| JP | 2009-004268 | A | 1/2009 |
| KR | 10-2015-0061605 | A | 6/2015 |
| KR | 10-2016-0136703 | A | 11/2016 |
| KR | 10-2022-0040233 | A | 3/2022 |
| KR | 10-2022-0048002 | A | 4/2022 |
| KR | 10-2022-0058134 | A | 5/2022 |

*Primary Examiner* — Helen Oi K Conley
(74) *Attorney, Agent, or Firm* — Fox Rothschild LLP

(57) ABSTRACT

Disclosed are a cathode for an all-solid-state battery having high energy density and a method of manufacturing the same in a dry manner.

19 Claims, 3 Drawing Sheets

DRY CATHODE FOR ALL-SOLID-STATE BATTERY WITH HIGH ENERGY DENSITY AND METHOD OF MANUFACTURING SAME

CROSS-REFERENCE TO RELATED APPLICATION

This application claims, under 35 U.S.C. § 119(a), the benefit of priority from Korean Patent Application No. 10-2023-0045491, filed on Apr. 6, 2023, the entire contents of which are incorporated herein by reference.

TECHNICAL FIELD

The present disclosure relates to a cathode for an all-solid-state battery having high energy density and a method of manufacturing the same in a dry manner.

BACKGROUND

In the related art, electrodes for lithium secondary batteries have been manufactured in a wet manner, e.g., by using a slurry including an active material is applying it onto a current collector or the like and then drying the slurry.

Recently, there is a trend of making electrodes thicker to increase the energy density of lithium secondary batteries, but it is difficult to form thick electrodes in a wet manner. A wet process may be problematic in that drying becomes difficult with an increase in electrode thickness, and a binder is excessively precipitated on the surface of the electrodes due to a lifting phenomenon of the binder dissolved in a solvent.

Moreover, a polar solvent is necessarily used to exhibit adhesion and solubility of the binder, but an all-solid-state battery including a sulfide-based solid electrolyte is problematic in that the sulfide-based solid electrolyte is vulnerable to polar solvents. Furthermore, contact between solid particles such as an active material, a solid electrolyte, a conductive material, and the like is very important for efficient electrochemical reaction in the all-solid-state battery. However, when electrodes are manufactured in a wet manner, the binder covers the surface of the solid particles, preventing contact between the solid particles.

SUMMARY

In preferred aspects, provided is a cathode for an all-solid-state battery with high energy density and a method of manufacturing the same in a dry manner.

A term "all-solid-state battery" as used herein refers to a rechargeable secondary battery that includes an electrolyte in a solid state for transferring lithium ions between the electrodes of the battery.

The term "dry manner" as used herein refers to a process that does not include using a liquid or water (including moisture) or that includes substantially less amount of a liquid or water (including moisture). In certain aspect, the dry manner process is in contrary to a process of "wet manner" that includes using a composition (e.g., slurry) that requires liquid or water (including moisture).

In an aspect, provided is a cathode for an all-solid-state battery, and the cathode includes a cathode active material, a solid electrolyte, and a fibrous binder. The cathode may suitably include the cathode active material in an amount of about 80 wt % to 87 wt % and the solid electrolyte in an amount of about 13 wt % to 20 wt % based on the sum of the weights of the cathode active material and the solid electrolyte, and the cathode may suitably include the fibrous binder in an amount of about 0.1 parts by weight to 3 parts by weight based on 100 parts by the sum of the weights of the cathode active material and the solid electrolyte.

In the cathode, lithium ion conductivity ($\sigma_{Li+}$) may be about 0.09 mS/cm or more.

In the cathode, a ratio ($\sigma_{Li+}/\sigma_{e-}$) of lithium ion conductivity ($\sigma_{Li+}$) to electron conductivity ($\sigma_{e-}$) may be about 1 to 30.5.

The fibrous binder may include polytetrafluoroethylene (PTFE).

The polytetrafluoroethylene (PTFE) may have a specific gravity of about 2.185 or less.

The fibrous binder may have a diameter of about 0.01 μm to 10 μm.

In an aspect, provided is a method of manufacturing a cathode for an all-solid-state battery.

The method includes preparing a starting material including a cathode active material, a solid electrolyte, and a binder precursor, obtaining a composite by applying shear stress to the starting material, and manufacturing a cathode using the composite.

In the composite, the cathode active material and the solid electrolyte may be adhered by a fibrous binder and the fibrous binder may be formed by fiberization of the binder precursor in the starting material.

The starting material may further include a conductive material.

Obtaining the composite may include applying shear stress to the starting material in a state in which the starting material is not mixed with a solvent.

The binder precursor may be in a form of a powder having an average particle size (D50) of about 1 μm to 1,000 μm.

The fibrous binder may include polytetrafluoroethylene.

The polytetrafluoroethylene may have a specific gravity of about 2.185 or less.

The fibrous binder may have a diameter of about 0.01 μm to 10 μm.

The cathode in a sheet form may be manufactured by calendering the composite.

Also in an aspect, provided is a lithium secondary battery including the cathode as described herein.

In another aspect, provided is a vehicle comprising the lithium secondary as described herein.

Other aspects of the invention are disclosed infra.

BRIEF DESCRIPTION OF THE DRAWINGS

The above and other features of the present disclosure will now be described in detail with reference to certain exemplary embodiments thereof illustrated in the accompanying drawings, which are given hereinbelow by way of illustration only, and thus are not limitative of the present disclosure, and wherein.

DETAILED DESCRIPTION

Figure 1:
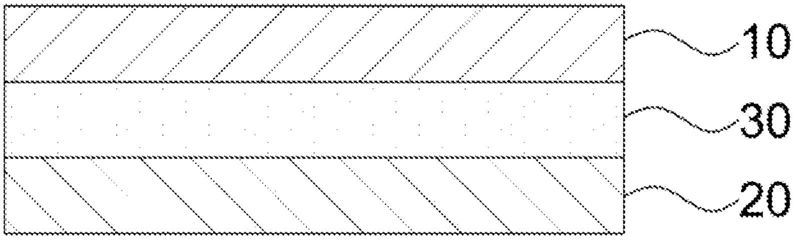
FIG. 1 shows an exemplary all-solid-state battery according to an exemplary embodiment of the present disclosure.

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5% 4%, 3%, 2%, %, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary all-solid-state battery according to an exemplary embodiment of the present disclosure. The all-solid-state battery may include a cathode 10, an anode 20 facing the cathode 10, and a solid electrolyte layer 30 interposed between the cathode 10 and the anode 20.

In an aspect, provide is a cathode 10 may include a cathode active material, a solid electrolyte, a fibrous binder, and a conductive material. Preferably, all components constituting the cathode 10 may be in a solid state.

Figure 2:
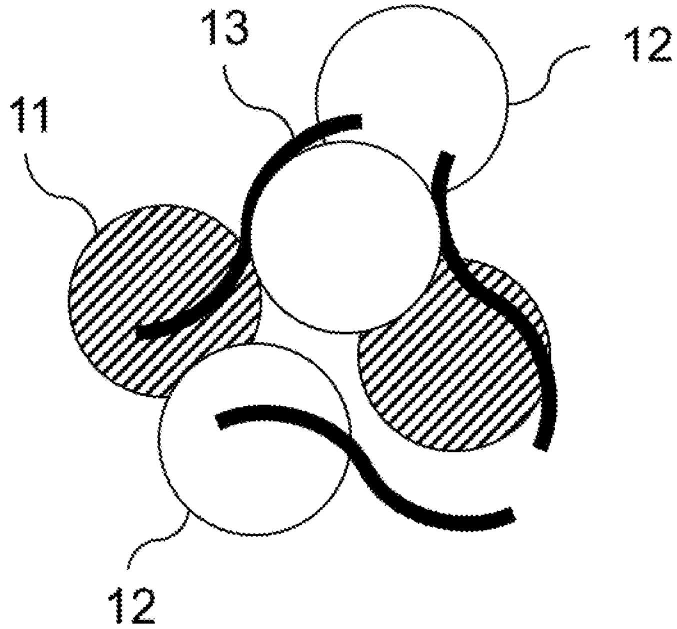
FIG. 2 shows the internal structure of an exemplary cathode according to an exemplary embodiment of the present disclosure.

FIG. 2 shows the internal structure of an exemplary cathode 10 according to an exemplary embodiment of the present disclosure. For example, solid particles such as a cathode active material 11, a solid electrolyte 12, and the like in the cathode 10 may be adhered to each other by a fibrous binder 13.

When electrodes are manufactured in a wet manner, a binder dissolved in a solvent is precipitated during removal of the solvent and covers the surface of solid particles such as an active material, etc. Accordingly, the precipitated binder prevents contact between the solid particles and thus blocks the lithium ion conduction path and the electron conduction path in electrodes, causing battery problems such as short circuit, performance degradation, etc.

Preferably, a cathode 10 may include a fibrous binder 13. For example, the fibrous binder 13 may adhere solid particles such as a cathode active material 11, a solid electrolyte 12, and the like, but the area covering the surface of the solid particles is very small, and thus problems with electrodes manufactured in a wet manner do not occur.

Therefore, when the fibrous binder 13 is used, the amount of the cathode active material 11 in the cathode 10 may be increased, and thus the energy density of the all-solid-state battery may be increased. However, when the amount of the cathode active material 11 is excessively increased, the amount of the solid electrolyte 12 may be relatively decreased, and thus lithium ion conductivity of the cathode 10 may be reduced and capacity of the all-solid-state battery may be lowered. The amount of the cathode active material 11 in the cathode 10 may be increased using the fibrous binder 13, but has not to exceed the limit capable of evenly increasing the energy density and capacity of the all-solid-state battery by balancing lithium ion conductivity and electron conductivity in the cathode 10.

The lithium ion conductivity ($\sigma_{Li+}$) of the cathode 10 may be about 0.09 mS/cm or greater. The upper limit of the lithium ion conductivity is not particularly limited, and may be, for example, about 1 mS/cm or less, about 0.9 mS/cm or less, about 0.8 mS/cm or less, about 0.7 mS/cm or less, about 0.6 mS/cm or less, or about 0.5 mS/cm or less. Here, lithium ion conductivity is a measure of the conduction tendency of lithium ions in the cathode 10, and the higher the value thereof, the faster the lithium ions move in the cathode 10. Although the method of measuring lithium ion conductivity is not particularly limited, for example, lithium ion conductivity may be calculated from the impedance value measured by manufacturing a symmetric cell of Li/solid electrolyte layer/cathode 10/solid electrolyte layer/Li, applying an alternating current potential of about 10 to 20 mV thereto, and then performing frequency sweep from about $1\times10^6$ to 0.001 Hz. Alternatively, lithium ion conductivity may be calculated from the impedance value measured by applying an alternating current potential of about 10 mV to the cathode 10 and then performing frequency sweep from about $1\times10^6$ to 0.001 Hz.

The ratio ($\sigma_{Li+}/\sigma_{e-}$) of lithium ion conductivity ($\sigma_{Li+}$) to electron conductivity ($\sigma_{e-}$) of the cathode 10 may be about 1 to 30.5. When the ratio ($\sigma_{Li+}/\sigma_{e-}$) thereof falls within the above numerical range, the energy density of an all-solid-state battery may be increased without reducing the capacity thereof. The electron conductivity ($\sigma_{e-}$) of the cathode 10 is not particularly limited, but may be 0.01 mS/cm to 0.09 mS/cm. Here, electron conductivity ($\sigma_{e-}$) is a measure of the conduction tendency of electrons in the cathode 10, and the higher the value thereof, the faster the electrons move in the cathode 10. Although the method of measuring electron conductivity is not particularly limited, for example, electron conductivity may be calculated from the impedance value measured by applying an alternating current potential of about 10 mV to the cathode 10 and then performing frequency sweep from $1\times10^6$ to 1 Hz. Alternatively, electron conductivity may be calculated from the current value measured by applying a direct current potential of about 1 to 50 mV to the cathode 10.

Based on the total weight of the cathode active material 11 and the solid electrolyte 12, the amount of the cathode active material 11 may be about 80 wt % to 87 wt %, and the amount of the solid electrolyte 12 may be about 13 wt % to 20 wt %. When the amount of the cathode active material is greater than 87 wt %, the ratio ($\sigma_{Li+}/\sigma_{e-}$) of lithium ion conductivity to electron conductivity of the cathode 10 may be less than about 1, and the capacity of the all-solid-state battery may be greatly decreased.

The cathode active material may intercalate and disintercalate lithium ions.

The cathode active material may include a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$, etc., a spinel-type active material such as $LiMn_2O_4$, $Li(Ni_{0.5}Mn_{1.5})O_4$, etc., an inverse-spinel-type active material such as $LiNiVO_4$, $LiCoVO_4$, etc., an olivine-type active material such as $LiFePO_4$, $LiMnPO_4$, $LiCoPO_4$, $LiNiPO_4$, etc., a silicon-containing active material such as $Li_2FeSiO_4$, $Li_2MnSiO_4$, etc., a rock-salt-layer-type active material in which a portion of a transition metal is substituted with a different metal, such as $LiNi_{0.8}Co_{(0.2-x)}AlxO_2$ ($0<x<0.2$), a spinel-type active material in which a portion of a transition metal is substituted with a different metal, such as $Li_{1+x}Mn_{2-x-y}M_yO_4$ (M being at least one selected from among Al, Mg, Co, Fe, Ni and Zn, $0<x+y<2$), lithium titanate such as $Li_4Ti_5O_{12}$, and the like.

The solid electrolyte may include a sulfide-based solid electrolyte, an oxide-based solid electrolyte, a halogen-based solid electrolyte, a polymer-based solid electrolyte, etc.

Examples of the sulfide-based solid electrolyte may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers and Z is any one selected from among Ge, Zn, and Ga), $Li_2S$—$GeS_2$, $Li_2S$—$SiS_2$—$Li_3PO_4$, $Li_2S$—$SiS_2$—$Li_xMO_y$ (in which x and y are positive numbers and M is any one selected from among P, Si, Ge, B, Al, Ga, and In), $Li_{10}GeP_2S_{12}$, and the like.

Examples of the oxide-based solid electrolyte may include perovskite-type LLTO ($Li_{3x}La_{2/3-x}TiO_3$), phosphate-based NASICON-type LATP ($Li_{1+x}Al_xTi_{2-x}(PO_4)_3$), and the like.

Examples of the halogen-based solid electrolyte may include $Li_3AlF_6$, $Li_3GaF_6$, $Li_3InCl_6$, $Li_3ScCl_6$, spinel $LiSc_{2/3}$ $Cl_4$, $Li_3ErCl_6$, $Li_3YCl_6$, $Li_3HoCl_6$, $Li_3YBr_6$, $Li_3HoBr_6$, $Li_3InBr_6$, $Li_2ZrCl_6$, $Li_{3x}M_{1x}Zr_xCl_6$ (M=Y, Er, Yb, and Fe), $Li_3L_aI_6$, $Li_3ErI_6$, and the like.

The polymer-based solid electrolyte may include a gel polymer electrolyte, a solid polymer electrolyte, etc.

The fibrous binder may include polytetrafluoroethylene (PTFE).

Polytetrafluoroethylene (PTFE) is a polymer in which all hydrogens of polyethylene (PE) are substituted with fluorines. Although polytetrafluoroethylene (PTFE) is a polymer having an aliphatic backbone, it is widely applied in the field of electronic materials due to excellent thermal stability and electrical stability thereof. In particular, this polymer is mainly used for a cathode due to low HOMO (highest occupied molecular orbital) level and high oxidation stability thereof. Since polytetrafluoroethylene (PTFE) has a cylindrical structure, it has a high glass transition temperature (Tg) but fiberization is possible even at a low temperature.

Polytetrafluoroethylene (PTFE) may have a specific gravity of about 2.185 or less. The lower limit of the specific gravity is not particularly limited, and may be, for example, about 2 or greater. Here, specific gravity may be used to determine the relative molecular mass of polytetrafluoroethylene (PTFE), and may be determined according to the procedure described in ASTM D4895. In order to perform testing, a specimen may be subjected to sintering and cooling cycles based on an appropriate sintering schedule as described in ASTM D4895. The specific gravity of polytetrafluoroethylene (PTFE) is inversely proportional to the molecular weight thereof. When the specific gravity of polytetrafluoroethylene (PTFE) is about 2.185 or less, the molecular weight of polytetrafluoroethylene (PTFE) may be sufficiently high and thus fiberization may occur well.

The fibrous binder may have a diameter of about 0.01 μm to 10 μm. Here, the diameter indicates the diameter of the cross section of the fibrous binder. The cross section refers to a cross section obtained by cutting the fibrous binder in a direction perpendicular to the length direction thereof. When the diameter thereof is less than about 0.01 μm, mechanical properties of the cathode 10 may not be sufficient. When the diameter thereof is greater than about 10 μm, lithium ion conductivity and electron conductivity of the cathode 10 may decrease.

The cathode 10 may include about 0.1 parts by weight to 3 parts by weight of the fibrous binder based on 100 parts by the sum of the weights of the cathode active material and the solid electrolyte. When the amount of the fibrous binder is greater than 3 parts by weight, lithium ion conductivity and electron conductivity of the cathode 10 may decrease.

The conductive material may include a particulate conductive material such as carbon black, graphene, etc., and/or a fibrous conductive material such as carbon fibers, carbon nanotubes, vapor grown carbon fibers (VGCF), etc.

The amount of the conductive material is not particularly limited, and may be, for example, about 0.1 parts by weight to 3 parts by weight based on 100 parts by the sum of the weights of the cathode active material and the solid electrolyte.

In an aspect, provide is a method of manufacturing the cathode 10 may include preparing a starting material including a cathode active material, a solid electrolyte, a binder precursor, and a conductive material, obtaining a composite by applying shear stress to the starting material, and manufacturing a cathode using the composite. Particularly, in the composite, the cathode active material and the solid electrolyte may be adhered by a fibrous binder and the fibrous binder may be formed by fiberization of the binder precursor in the starting material.

Since all of the cathode active material, the solid electrolyte, the binder precursor, and the conductive material are in a solid powder phase, the starting material may be prepared by mixing the components described above without any solvent.

Obtaining the composite may include applying shear stress to the starting material in a state in which the starting material is not mixed with a solvent. The method of manufacturing the cathode 10 according to exemplary embodiments of the present disclosure is performed in a dry manner that does not use a solvent, and thus a lifting phenomenon of the binder in a wet manner does not occur, which is advantageous to make the cathode 10 thicker.

The process of applying shear stress is not particularly limited. Shear stress may be applied using a device or method typically used in the technical field to which the present disclosure belongs.

The binder precursor may be in the form of a powder having an average particle size (D50) of about 1 μm to 1,000 μm.

The cathode 10 may be manufactured in the form of a sheet by calendering the composite.

The anode 20 may include an anode active material, a solid electrolyte, and the like.

The anode active material may include a carbon active material, a metal active material, or a complex thereof.

The carbon active material may include graphite such as mesocarbon microbeads, highly oriented graphite, etc., and/or amorphous carbon such as hard carbon, soft carbon, etc.

The metal active material may include In, Al, Si, Sn, or an alloy containing at least one thereof.

The solid electrolyte may be the same as or different from the solid electrolyte included in the cathode 10, and may include a sulfide-based solid electrolyte, an oxide-based solid electrolyte, a halogen-based solid electrolyte, or a polymer-based solid electrolyte. Since the kind of each solid electrolyte is described above, it is omitted below.

The solid electrolyte layer 30 may conduct lithium ions between the cathode 10 and the anode 20.

The solid electrolyte layer 30 may include a solid electrolyte. The solid electrolyte may be the same as or different from the solid electrolyte included in the cathode 10, and may include a sulfide-based solid electrolyte, an oxide-based solid electrolyte, a halogen-based solid electrolyte, or a polymer-based solid electrolyte. Since the kind of each solid electrolyte is described above, it is omitted below.

EXAMPLE

A better understanding of the present disclosure may be obtained through the following examples. These examples are merely set forth to illustrate the present disclosure, and are not to be construed as limiting the scope of the present disclosure.

Example 1

A starting material was prepared by mixing a cathode active material, a solid electrolyte, a binder precursor, and a conductive material. Nickel-cobalt-manganese oxide was used as the cathode active material, a sulfide-based solid electrolyte was used as the solid electrolyte, polyethylene-fluoroethylene (PTFE) powder was used as the binder precursor, and carbon black was used as the conductive material. 75 wt % of the cathode active material and 25 wt % of the solid electrolyte were mixed, and 1 part by weight of the binder precursor and 2 parts by weight of the conductive material were added based on 100 parts by weight of the cathode active material and the solid electrolyte.

A clay-type composite was obtained by applying shear stress to the starting material in a state in which a solvent was not added to the starting material.

A cathode in a sheet form was manufactured by calendering the composite.

The cathode was placed on a cathode current collector and hot-pressed at a temperature of about 50° C. to 200° C., thus attaching the cathode to the cathode current collector.

A solid electrolyte layer including a sulfide-based solid electrolyte was formed on the cathode. An all-solid-state battery was completed by attaching an anode and an anode current collector to the upper surface of the solid electrolyte layer.

Example 2

A cathode and an all-solid-state battery including the same were manufactured in the same manner as in Example 1, with the exception that 80 wt % of the cathode active material and 20 wt % of the solid electrolyte were mixed.

Example 3

A cathode and an all-solid-state battery including the same were manufactured in the same manner as in Example 1, with the exception that 85 wt % of the cathode active material and 15 wt % of the solid electrolyte were mixed.

Example 4

A cathode and an all-solid-state battery including the same were manufactured in the same manner as in Example 1, with the exception that 87 wt % of the cathode active material and 13 wt % of the solid electrolyte were mixed.

Comparative Example 1

A cathode and an all-solid-state battery including the same were manufactured in the same manner as in Example 1, with the exception that 90 wt % of the cathode active material and 10 wt % of the solid electrolyte were mixed.

Comparative Example 2

A cathode slurry was prepared by adding a cathode active material, a solid electrolyte, a binder, and a conductive material to a solvent. The same cathode active material, solid electrolyte, and conductive material as in Example 1 were used. Butadiene rubber was used as the binder. 75 wt % of the cathode active material and 25 wt % of the solid electrolyte were added to an excess of the solvent, and 1 part by weight of the binder and 2 parts by weight of the conductive material were added based on 100 parts by weight of the cathode active material and the solid electrolyte.

A cathode was manufactured by applying the cathode slurry onto a cathode current collector followed by drying.

An all-solid-state battery was completed by forming a solid electrolyte layer, an anode, and an anode current collector on the cathode in the same manner as in Example 1.

Comparative Example 3

A cathode and an all-solid-state battery including the same were manufactured in the same manner as in Comparative Example 2, with the exception that 80 wt % of the cathode active material and 20 wt % of the solid electrolyte were mixed.

Comparative Example 4

A cathode and an all-solid-state battery including the same were manufactured in the same manner as Comparative Example 2, with the exception that 85 wt % of the cathode active material and 15 wt % of the solid electrolyte were mixed.

Comparative Example 5

A cathode and an all-solid-state battery including the same were manufactured in the same manner as in Comparative Example 2, with the exception that 90 wt % of the cathode active material and 10 wt % of the solid electrolyte were mixed.

Lithium ion conductivity ($\sigma_{Li+}$) and electron conductivity ($\sigma_{e-}$) of the cathodes according to Examples 1 to 4 and Comparative Examples 1 to 5 were measured. The lithium ion conductivity and electron conductivity were determined from the impedance value measured by applying an alternating current potential of about 10 mV to each cathode and then performing frequency sweep from $1\times10^6$ to 1 Hz.

In addition, the internal resistance of the all-solid-state batteries according to Examples 1 to 4 and Comparative Examples 1 to 5 was measured through DCIR (direct current internal resistance). Here, internal resistance was measured using voltage and current values that change whenever charging and discharging pulses are applied to each all-solid-state battery for a predetermined period of time.

Figure 3:
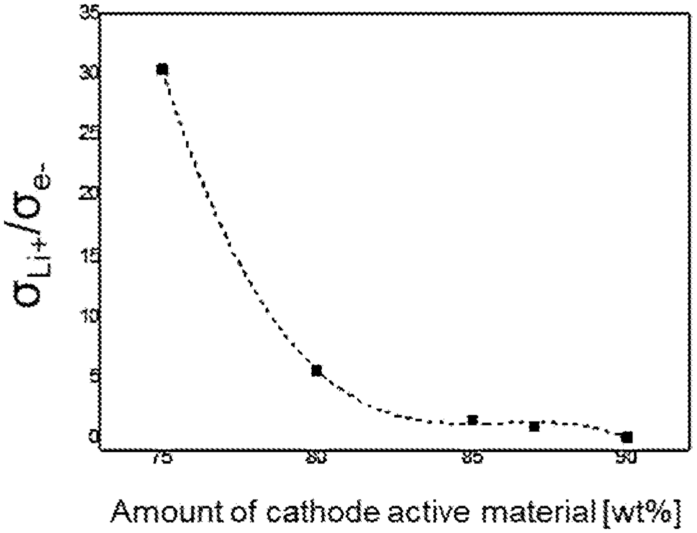
FIG. 3 shows the ratio ($\sigma_{Li+}/\sigma_{e-}$) of lithium ion conductivity to electron conductivity of cathodes according to Examples 1 to 4 and Comparative Example 1.

The ratio ($\sigma_{Li+}/\sigma_{e-}$) of lithium ion conductivity to electron conductivity of the cathodes according to Examples 1 to 4 and Comparative Example 1 is shown in FIG. 3 and Table 1 below. The x-axis of FIG. 3 represents the amount of the cathode active material, which is based on the total weight of the cathode active material and the solid electrolyte.

Figure 4:
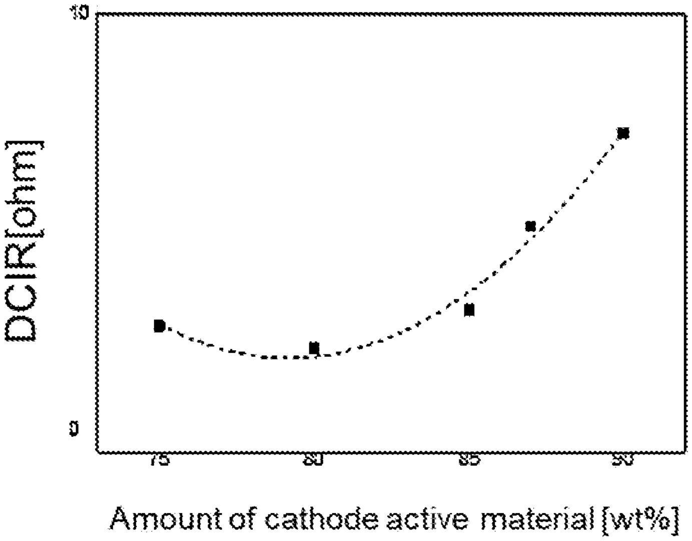
FIG. 4 shows DCIR (direct current internal resistance) values of all-solid-state batteries according to Examples 1 to 4 and Comparative Example 1.

The DCIR values of the all-solid-state batteries according to Examples 1 to 4 and Comparative Example 1 are shown in FIG. 4 and Table 1 below.

Figure 5:
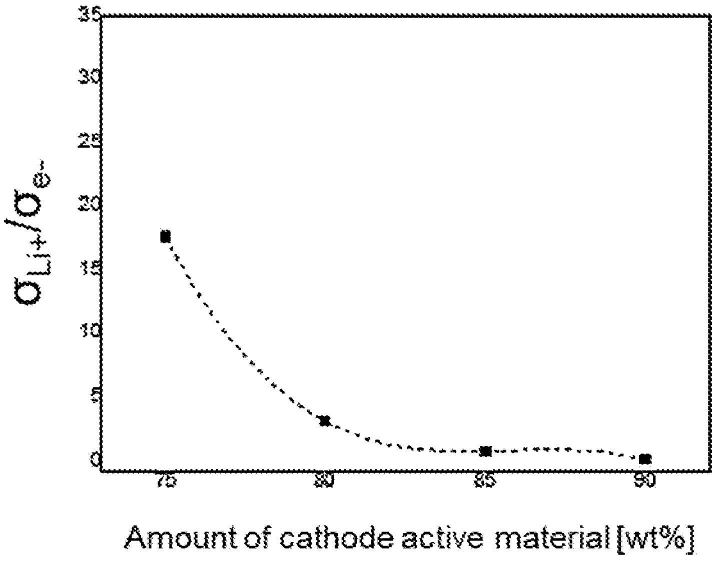
FIG. 5 shows the ratio ($\sigma_{Li+}/\sigma_{e-}$) of lithium ion conductivity to electron conductivity of cathodes according to Comparative Examples 2 to 5.

The ratio ($\sigma_{Li+}/\sigma_{e-}$) of lithium ion conductivity to electron conductivity of the cathodes according to Comparative Examples 2 to 5 is shown in FIG. 5 and Table 1 below. The x-axis of FIG. 5 shows the amount of the cathode active material, which is based on the total weight of the cathode active material and the solid electrolyte.

Figure 6:
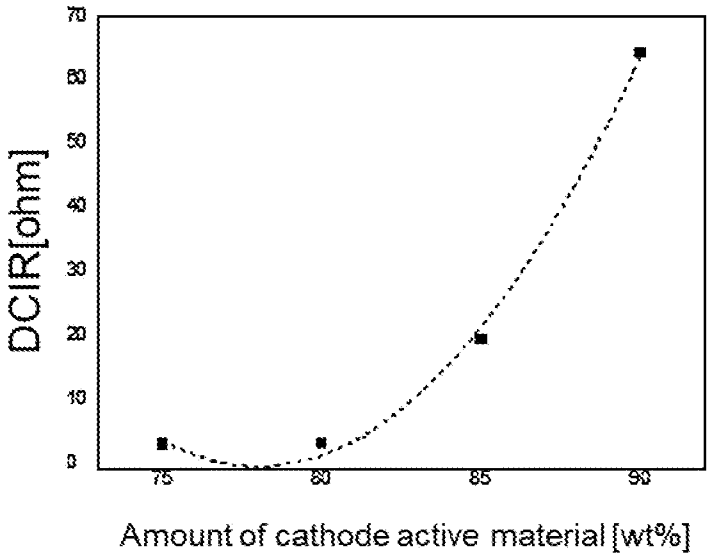
FIG. 6 shows DCIR values of all-solid-state batteries according to Comparative Examples 2 to 5.

The DCIR values of the all-solid-state batteries according to Comparative Examples 2 to 5 are shown in FIG. 6 and Table 1 below.

TABLE 1

| Classification | $\sigma_{Li+}$ [mS/cm] | $\sigma_{e-}$ [mS/cm] | $\sigma_{Li+}/\sigma_{e-}$ | DCIR [ohm] | Design capacity [mAh/cm$^2$] | Expression capacity [mAh/cm$^2$] |
|---|---|---|---|---|---|---|
| Example 1 | 0.380 | 0.016 | 30.4 | 2.51 | 4 | 3.92 |
| Example 2 | 0.208 | 0.037 | 5.56 | 1.97 | 4 | 3.86 |
| Example 3 | 0.119 | 0.077 | 1.55 | 2.91 | 4 | 3.84 |
| Example 4 | 0.092 | 0.089 | 1.03 | 4.92 | 4 | 3.60 |
| Comparative Example 1 | 0.033 | 0.233 | 0.14 | 7.15 | 4 | 2.2 |
| Comparative Example 2 | 0.178 | 0.010 | 17.6 | 2.99 | 4 | 3.84 |
| Comparative Example 3 | 0.097 | 0.031 | 3.11 | 3.15 | 4 | 3.80 |
| Comparative Example 4 | 0.052 | 0.070 | 0.75 | 19.40 | 4 | 1.7 |
| Comparative Example 5 | 0.012 | 0.188 | 0.06 | 69.20 | 4 | 0.3 |

As shown in Table 1, Examples 1 to 4 satisfying the amount of the cathode active material, lithium ion conductivity, and the ratio of lithium ion conductivity to electron conductivity proposed in the present disclosure exhibited low internal resistance and superior expression capacity compared to Comparative Example 1.

Also, when comparing Example 1 with Comparative Example 2, Example 2 with Comparative Example 3, and Example 3 with Comparative Example 4, even when the cathode active material was used in the same amount, Examples in a dry manner exhibited low internal resistance and superior expression capacity compared to Comparative Examples.

According to various exemplary embodiments of the present disclosure, an all-solid-state battery with high energy density can be obtained.

According to various exemplary embodiments of the present disclosure, an all-solid-state battery in which blocking of the lithium ion conduction path and electron transfer path in electrodes is minimized can be obtained.

According to various exemplary embodiments of the present disclosure, a method of manufacturing an all-solid-state battery with high energy density in a dry manner can be provided.

The effects of the present disclosure are not limited to the above-mentioned effects. It should be understood that the effects of the present disclosure include all effects that can be inferred from the description of the present disclosure.

As the embodiments of the present disclosure have been described in detail above, the scope of the present disclosure is not limited to the above-described embodiments, and various modifications and improvements made by those skilled in the art using the basic concept of the present disclosure defined in the following claims are also included in the scope of the present disclosure.

What is claimed is:

1. A cathode for an all-solid-state battery, comprising:

a cathode active material, a solid electrolyte, and a fibrous binder, wherein the cathode comprises the cathode active material in an amount of 80 wt % to 87 wt %, the solid electrolyte an amount of 13 wt % to 20 wt %, wt % based on the sum of the weights of the cathode active material and the solid electrolyte, and the cathode comprises the fibrous binder in an amount of 0.1 parts by weight to 3 parts by weight based on 100 parts by the sum of the weights of the cathode active material and the solid electrolyte.

2. The cathode of claim 1, wherein lithium ion conductivity ($\sigma_{Li+}$) is 0.09 mS/cm or greater.

3. The cathode of claim 1, wherein a ratio ($\sigma_{Li+}/\sigma_{e-}$) of lithium ion conductivity ($\sigma_{Li+}$) to electron conductivity ($\sigma_{e-}$) is 1 to 30.5.

4. The cathode of claim 1, wherein the fibrous binder comprises polytetrafluoroethylene.

5. The cathode of claim 4, wherein the polytetrafluoroethylene has a specific gravity of 2.185 or less.

6. The cathode of claim 1, wherein the fibrous binder has a diameter of 0.01 μm to 10 μm.

7. A method of manufacturing a cathode for an all-solid-state battery, comprising:

preparing a starting material comprising a cathode active material, a solid electrolyte, and a binder precursor;

obtaining a composite by applying shear stress to the starting material; and manufacturing a cathode using the composite, wherein the cathode comprises the cathode active material in an amount of 80 wt % to 87 wt % and the solid electrolyte in an amount of 13 wt % to 20 wt % based on the sum of the weights of the cathode active material and the solid electrolyte, and the cathode comprises a fibrous binder resulted from fiberization of the binder precursor in an amount of 0.1 parts by weight to 3 parts by weight of based on 100 parts by the sum of the weights of the cathode active material and the solid electrolyte.

8. The method of claim 7, wherein in the composite, the cathode active material and the solid electrolyte are adhered by a fibrous binder and the fibrous binder is formed by fiberization of the binder precursor in the starting material.

9. The method of claim 7, wherein the starting material further comprises a conductive material.

10. The method of claim 7, wherein lithium ion conductivity ($\sigma_{Li+}$) of the cathode is 0.09 mS/cm or more.

11. The method of claim 7, wherein a ratio ($\sigma_{Li+}\sigma_{e-}$) of lithium ion conductivity ($\sigma_{Li+}$) to electron conductivity ($\sigma_{e-}$) of the cathode is 1 to 30.5.

12. The method of claim 7, wherein obtaining the composite comprises applying shear stress to the starting material in a state in which the starting material is not mixed with a solvent.

13. The method of claim 7, wherein the binder precursor is in a form of a powder having an average particle size (D50) of 1 μm to 1,000 μm.

14. The method of claim 7, wherein the fibrous binder comprises polytetrafluoroethylene.

15. The method of claim 14, wherein the polytetrafluoroethylene has a specific gravity of 2.185 or less.

16. The method of claim 7, wherein the fibrous binder has a diameter of 0.01 μm to 10 μm.

17. The method of claim 7, wherein a cathode in a sheet form is manufactured by calendering the composite.

18. A lithium secondary battery comprising a cathode of claim 1.

19. A vehicle comprising a lithium secondary of claim 18.

* * * * *